United States Patent [19]

Sweany

[11] 4,145,688

[45] Mar. 20, 1979

[54] LOW COST BUZZER

[75] Inventor: Louis P. Sweany, Carmel, Ind.

[73] Assignee: P. R. Mallory & Co. Inc., Indianapolis, Ind.

[21] Appl. No.: 801,526

[22] Filed: May 31, 1977

[51] Int. Cl.[2] .......................... G01K 1/08; G08B 3/00

[52] U.S. Cl. .................................... 340/391; 340/387; 340/396; 340/402

[58] Field of Search ............... 340/387, 388, 396, 402, 340/309.1, 403, 391

[56] References Cited

U.S. PATENT DOCUMENTS

| | | | |
|---|---|---|---|
| 3,408,645 | 10/1968 | Doggart | 340/387 |
| 3,618,080 | 11/1971 | Frey | 340/396 |
| 3,760,411 | 9/1973 | Youhanian | 340/388 |
| 3,938,143 | 2/1976 | Little | 340/402 |
| 4,003,043 | 1/1977 | Little | 340/309.1 |

*Primary Examiner*—Harold I. Pitts

*Attorney, Agent, or Firm*—Hoffmann, Meyer & Coles

[57] ABSTRACT

A buzzer alarm has an electrically insulative housing fabricated of two molded pieces of electrically insulative material with a recessed vibratable diaphragm section constructed as a portion thereof. The buzzer alarm includes cooperating vibrating means and timer means with the vibrating means being carried by a frame that is carried along a wall which is complimentary to another wall which carries a terminal block.

7 Claims, 4 Drawing Figures

LOW COST BUZZER

SUMMARY OF THE INVENTION

Generally speaking, the present invention relates to a buzzer alarm which comprises an electrically insulative housng fabricated of two molded pieces of electrically insulating material and including a resessed vibratable diaphragm section constructed as a portion thereof, the diaphragm including a striking area; cooperating vibrating and timer means carried within the housing and providing a vibrating output which is turned off at a predetermined interval, the vibrating means engaging the striking area at predetermined time intervals; and electrical terminals extending into the housing to provide an electrical power source to the vibrating means and the timer means.

In another aspect of the invention, the buzzer alarm comprises a housing fabricated of an electrically insulated material; a terminal block carried in the housing along a first wall thereof; at least four electrical terminals carried by the terminal block and extending out the first wall; a thermal timing means carried by two of the electrical terminals to be in electrical contact therewith; a U-shaped frame carried in the housing along a second wall which is complimentary to the first wall; a reed-coil type vibrating means carried within the U-shaped frame; lead wires electrically connecting the reed-coil type vibrating means to the other two electrical terminals; and a vibratable diaphragm carried by the housing and in working relation ship to the reed-coil type vibrating means.

BACKGROUND OF THE INVENTION

This invention relates to an audio signal device or buzzer of the type used in an automobile signaling a warning to the driver when he has left the lights on or as another example when he fails to fasten his seat belt.

In buzzers such as these, low cost and simplicity of manufacturing is a prime consideration in their manufacture. Therefore fabricators are constantly seeking new ways to package such devices so that they may be produced in a simple and economical manner.

Furthermore in such devices there is usually associated with the buzzer mechanism a timing means which enables the buzzer to be sounded for a predetermined time interval. This further complicates the fabrication and packaging problems.

FEATURES OR OBJECTS OF THE INVENTION

It is, therefore, a feature of the present invention to provide a buzzer alarm which includes cooperating vibrating and timer means which is simple and economical to produce. Another feature of the invention is the provision of such a buzzer alarm wherein an electrically insulative housing is fabricated of two molded pieces of electrically insulating material and which includes a vibratable diaphragm section. Another feature of the invention is the provision of such a buzzer alarm wherein the diaphragm section includes a striking area comprised of a dimple extending fromthe diaphragm into the housing. Another feature of the invention is the provision of such a buzzer alarm wherein the vibrating means includes a vibrating reed and wherein a stop means is carried by the housing and engages the vibrating reed to limit its amplitude of vibration. Yet another feature of the invention is the provision of such a buzzer alarm wherein the housing includes a cup shaped member and a cover closing the same and wherein the cup shaped member and the cover included cooperating snap on means securing the cover to the cup shaped member. Still another feature of the invention is the provision of such a buzzer alarm having at least four electric terminals carried by a terminal block disposed within the housing along a wall thereof and with a U-shaped frame for carrying the vibrating means disposed within the housing along another wall which is complimentary to the first wall. Yet another feature of the invention is the provision of such a buzzer alarm wherein a thermal timing means is carried by two of the electrical terminals and wherein lead wires electrically connected the vibrating means to the other two of the terminals.

DETAILED DESCRIPTION

Figure 1:
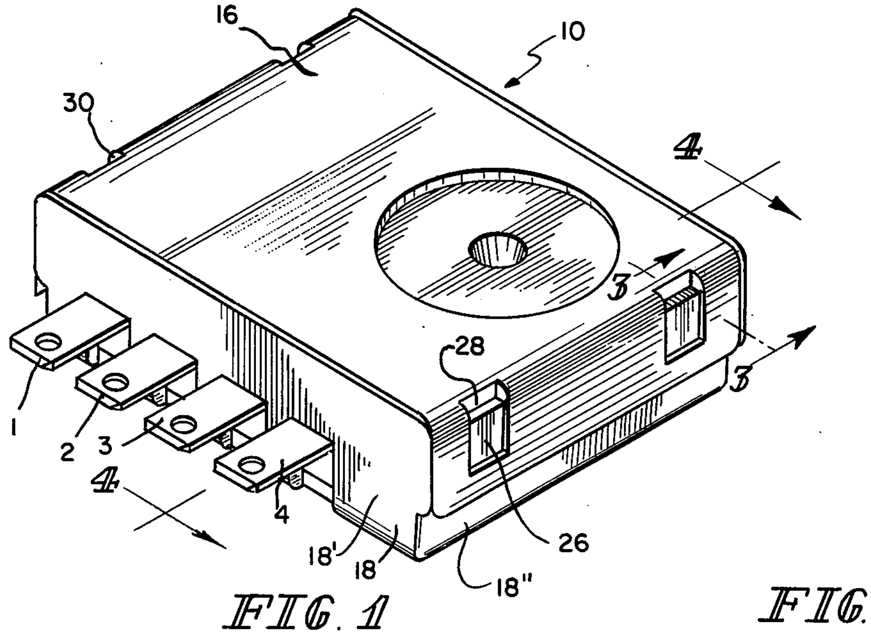
FIG. 1 is an isometric view of a buzzer alarm incorporating the features of the invention.
Figure 3:
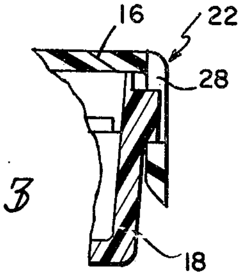
FIG. 3 is a section taken along the line 3—3 of FIG. 1.
Figure 2:
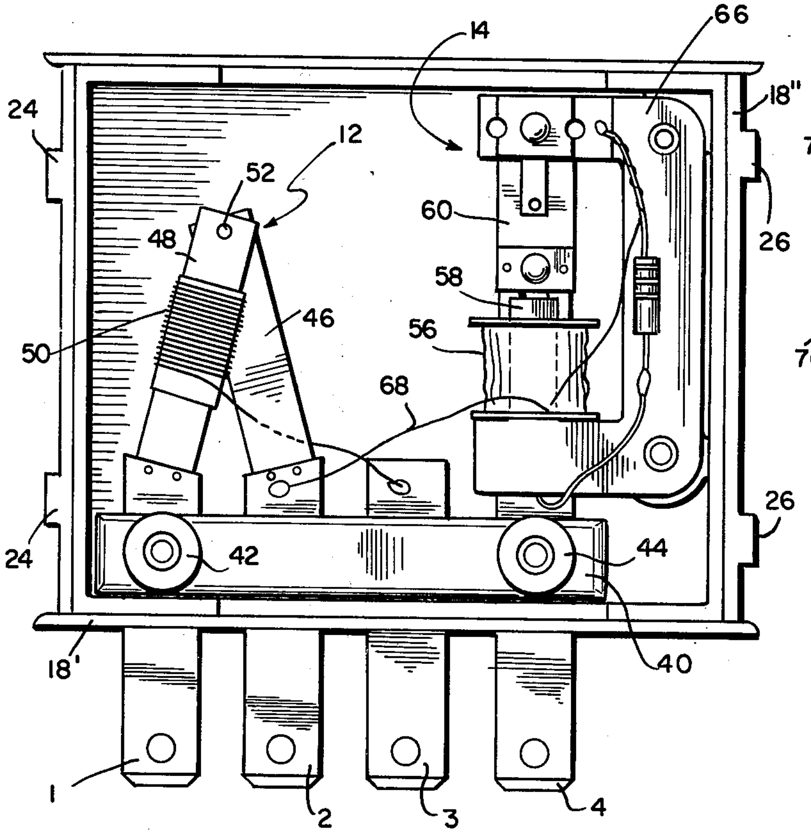
FIG. 2 is a top plan view of the buzzer with a portion of its housing removed.
Figure 4:
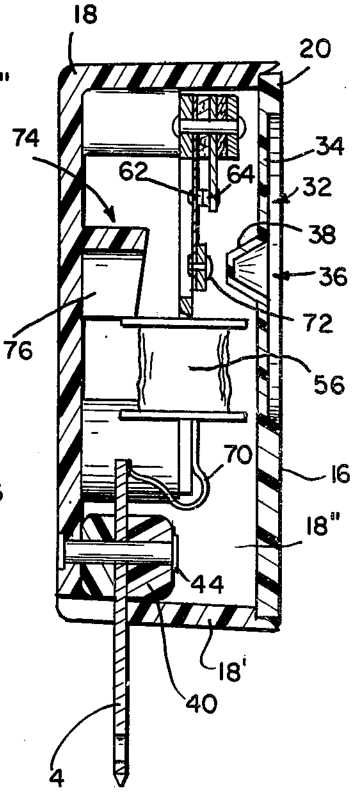
FIG. 4 is a section taken along the line 4—4 of FIG. 1.

Referring now to the drawings, there is shown a buzzer alarm 10 which in general includes a thermal timing means 12 which cooperates with a vibrating means 14 to provide timed vibrating outputs at predetermined intervals, both of which are carried in a housing 16. Housing 16 includes a cup shaped member 18 and a cover 20 closing the cup shaped member. As is particularly shown in FIG. 3, cup shaped member 18 and cover 20 includes cooperating snap on means 22 to secure the cover to the cup shaped member. Snap on means 22 includes a pair of tabs 24 and 26 disposed on opposed sides of the cup shaped member which engages cooperating apertures 28 and 30 provided in the cover.

Both the cup shaped member 18 and cover 20 are fabricated from molded pieces of electrically insulative material and cover 20 includes a vibratable diaphragm section 32 formed as a portion thereof. Such section includes a thin recessed protion 34 having a striking area 36. Striking area 36 includes a dimple 38, the dimple having a frustoconical section. In prior art buzzer devices, the vibrating diaphragm section has usually been formed from a separate thin sheet of metal or a composite consisting of a thin sheet of metal and a thin sheet of electrically insulative material. Such a structure results in inherent fabrication problems and markedly increases the cost of the buzzer. By providing the thin recessed section as part of the cover with the striking area 36 there is provided a structure which is simple and economical to produce.

A terminal block 40 is carried along one wall 18′ of cup shaped member 18. As shown the terminal block is connected to the cup shaped member through some suitable means such as rivets 42 and 44. The terminal block carries four electrical terminals 1–4 which extend into the housing. A thermal timing means 12 is carried by electrical terminals 1 and 2. Thermal timing means 12 includes two bimetal strips 46 and 48, a heater coil 50 and electrical contact 52 carried by strip 50. As is well known in the art, when electrical power is supplied to the coil, strip 48 will be heated to bend and break electrical contact between contact 52 and contact (not shown) carried on strip 46.

Vibrating means 14 includes a coil 56 carried on a core 58, and armature 60 with cooperating electrical contacts 62 and 64. The vibrating means is carried by U-shaped frame 66 which is riveted to the cup shaped member 18 along wall 18'. Electrical contact between coil 56 and electrical terminals 2 and 4 is made through lead wires 68 and 70. In some prior art buzzer alarms, the vibrating means is carried by one of the electrical terminals. However, even though such a structure will eliminate the need for an extra lead wire, such structure has, for the most part, been found to be more complex in manufacturing.

The operation of the buzzer alarm is well known in the art and does not form a part of the present invention. Briefly, however, with power applied to coil 56, armature 60 vibrates causing a striker 72 to vibrate and otherwise engage striking area 36. Engagement of the striker with the striking area causes vibration of the thin section 34 to emit an audible sound. The opening and closing of electrical contact 62 and 64 provide the electromagnetic drive energy to the coil. Stop means 74 prevents excessive vibration of the armature by limiting its amplitude of vibration. Stop means 74 includes a block 76 unitarily constructed with cup shaped member 18.

What is claimed is:

1. A buzzer alarm comprising:

(a) a housing fabricated of an electrically insulative material, (b) a terminal block carried in said housing along a first wall thereof, (c) at least four electrical terminals carried by said terminal block and extending out said first wall, (d) a thermal timing means carried by two of said electrical terminals to be in electrical contact therewith, (e) a U-shaped frame carried in said housing along a second wall complementary to said first wall, (f) a reed-coil type buzzer means carried within said U-shaped frame, (g) lead wires electrically connecting said reed-coil type buzzer means to the other two of said electrical terminals, and (h) a vibratable diaphragm having a striking area carried by said housing and in working relation to said reed-coil type buzzer means.

2. A buzzer alarm according to claim 1 alarm wherein said striking area includes a dimple extending from said diaphragm into said housing.

3. A buzzer according to claim 2 wherein said dimple is a frusto-conical section.

4. A buzzer alarm according to claim 1 wherein said housing includes a cup shaped member having an open end and a cover closing same, and said diaphragm section is a portion of said cover.

5. A buzzer alarm according to claim 1 wherein said vibrating means includes a vibrating reed and wherein a stop means carried by said cup shaped member engages said vibrating reed to limit the amplitude of vibration thereof.

6. A buzzer alarm according to claim 5 wherein said stop means is a block unitarily constructed with said cup shaped member.

7. A buzzer alarm according to claim 4 wherein said cover and said cup shaped member include cooperating snap on means securing said cover to said cup shaped member.

* * * * *